United States Patent [19]

Mastache et al.

[11] Patent Number: 5,579,190
[45] Date of Patent: *Nov. 26, 1996

[54] DISK DRIVE HAVING AN IMPROVED TRANSDUCER SUSPENSION ASSEMBLY

[75] Inventors: Mark Mastache; Peter A. Capano, both of Boise, Id.

[73] Assignee: Hewlett-Packard Company, Palo Alto, Calif.

[*] Notice: The term of this patent shall not extend beyond the expiration date of Pat. No. 5,363,263.

[21] Appl. No.: 406,756

[22] Filed: Mar. 16, 1995

Related U.S. Application Data

[63] Continuation of Ser. No. 856,013, Apr. 8, 1992.

[51] Int. Cl.$^6$ .............................. G11B 5/55; G11B 21/08
[52] U.S. Cl. ........................................ 360/106; 360/104
[58] Field of Search ................................. 360/104–107, 360/97.01, 97.03, 98.02, 98.07; 369/111

[56] References Cited

U.S. PATENT DOCUMENTS

| | | | |
|---|---|---|---|
| 4,544,972 | 10/1985 | Kogure et al. | 360/106 |
| 4,754,353 | 6/1988 | Levy | 360/106 |
| 4,807,054 | 2/1989 | Sorensen et al. | 360/104 |
| 4,829,395 | 5/1989 | Coon et al. | 360/104 |
| 4,870,525 | 9/1989 | Wong et al. | 360/137 |
| 4,912,583 | 3/1990 | Hinlein | 360/104 |
| 4,985,652 | 1/1991 | Oudet | 310/15 |
| 4,991,045 | 2/1991 | Oberg | 360/104 |
| 5,027,242 | 6/1991 | Nishida et al. | 360/106 |
| 5,109,310 | 4/1992 | Ohkjita et al. | 360/106 |
| 5,153,794 | 10/1992 | Hinlein | 360/104 |
| 5,172,286 | 12/1992 | Jurgenson | 360/106 |
| 5,184,265 | 2/1993 | Foote et al. | 360/106 |
| 5,189,577 | 2/1993 | Nishida et al. | 360/106 |
| 5,191,705 | 3/1993 | Toensing | 360/104 |
| 5,214,552 | 5/1993 | Haga | 360/106 |
| 5,283,704 | 2/1994 | Reidenbach | 360/97.01 |

FOREIGN PATENT DOCUMENTS

| | | | |
|---|---|---|---|
| 0428289 | 5/1991 | European Pat. Off. | G11B 8/48 |
| 0438806 | 7/1991 | European Pat. Off. | |
| 0494033 | 7/1992 | European Pat. Off. | |
| 3940909 | 6/1990 | Germany | G11B 5/48 |
| 0020908 | 2/1978 | Japan | 360/106 |
| 0182067 | 9/1985 | Japan | 360/106 |
| 63-142574 | 6/1988 | Japan | 360/106 |
| 3-127388 | 5/1991 | Japan | 360/104 |
| 9209076 | 5/1992 | United Kingdom | 360/104 |
| WO92/22056 | 12/1992 | WIPO | G11B 5/54 |

OTHER PUBLICATIONS

IBM Technical Disclosure Bulletin vol. 35, No. 7, Dec. 1992, pp. 39–40 'Divided autuator arm for high–density hard disk drives' * the whole document *.

*Primary Examiner*—Stuart S. Levy
*Assistant Examiner*—Brian E. Miller

[57] ABSTRACT

A hard disk drive having an actuator assembly in which the armstack structure comprises only load beams. The load beams are assembled by stacking on a tubular member along with the movable member of the actuator motor, or other actuator drive mechanism, and after alignment are secured to the tubular member. This actuator structure is applicable to both rotary and linear actuators in disk drives. In the rotary actuator structure, the tubular member or hub is journaled in the base of the drive for rotation about the axis of the tubular member. In the linear actuator structure, the tubular member, being fastened to the moving part of the linear drive mechanism, linearly moves with that mechanism. The load beams and the movable actuator drive mechanism are secured to the tubular member by a ball swaging operation which forcibly expands the tubular member into secure frictional engagement with the items assembled thereon to thereby integrate the assembly with a single ball swaging pass through a single member.

10 Claims, 5 Drawing Sheets

1

DISK DRIVE HAVING AN IMPROVED TRANSDUCER SUSPENSION ASSEMBLY

RELATED APPLICATIONS

This is a continuation of U.S. application Ser. No. 07/856,013, entitled "Disk Drive Having an Improved Transducer Suspension Assembly," filed Apr. 8, 1992.

This is related to a U.S. Application of George A. Drennen, Ser. No. 07/856,006, entitled "Disk Drive Having An Improved Transducer Suspension Assembly," filed Apr. 8, 1992, now U.S. Pat. No. 5,363,262.

FIELD OF THE INVENTION

This invention relates generally to disk drives and more particularly to the mechanical aspects of such drives as related to the transducer or head suspension assemblies.

BACKGROUND OF THE INVENTION

U.S. Pat. No. 4,829,329, to Coon et al, describes disk drives having transducer or head suspension assemblies in which individual load beams, carrying transducers at their distal ends, are attached at their mounting ends to individual arms of an armstack assembly by means of screws or ball swaged fittings. The thrust of the teachings of Coon et al is the reduction in the axial spacing of the disks, in order, by this expedient alone, to increase the volumetric density of recorded data by increasing the number of disks that can be packed in a given volume.

Trends toward smaller disk drives, particularly for applications where portability is a consideration, require drives of smaller form factor, of high data capacity, which are sufficiently rugged to withstand the mechanical shock associated with portability and which are light in weight. Down size scaling of drives, such as that of Coon et al, is not mechanically feasible. A new approach to the mechanical configuration of disk drives is needed to achieve a drive of significantly reduced form factor, providing improved performance in a mechanically abusive environment.

SUMMARY OF THE INVENTION

A significant reduction in the size of a disk drive is achieved, according to this invention, by attaching the load beam of the transducer or head suspension assembly directly to the moving part of the actuator drive motor or mechanism, eliminating unnecessary armstack and/or actuator structure therebetween. By this expedient, reductions in both the size and weight/inertia of the transducer actuator suspension assembly are achieved.

This invention is applicable in both linear and rotary actuator drives. The invention is disclosed herein in a rotary actuator drive configuration which embodies the applicant's best mode for practicing the invention.

In prior art types of rotary actuator disk drives, the transducer actuator/suspension assembly is journaled in bearings mounted upon a stationary support in the disk drive. Usually this support is the base and is so termed herein. The actuator assembly, as it moves angularly about the bearing axis, moves the transducers, individually connected to the respective arms of the actuator armstack, to different radial locations with respect to the surfaces of the disks.

In the implementation of the best mode for practicing this invention, the conventional actuator armstack structure of the rotary actuator, as seen in Coon et al, is eliminated. Instead, a spindle, comprising a cylindrical or tubular member preferably of circular cross section, functioning as the hub in the rotary actuator assembly, is rotably mounted in bearings on the disk drive base to rotate about its central axis. This tubular member has a flange adjacent one end. Load beams of flexible sheet steel, such as stainless steel sheet, are each provided with a reinforcing plate adjacent one end, the mounting end. An opening or hole is formed through the reinforcing plate and the load beam, sized to provide a slip or sliding fit over the tubular member. A transducer is attached to the other end, the distal end, of each load beam. A motor, preferably a voice coil motor, has a stationary part, the permanent magnets, fixed with respect to the base of the drive, and a moving part, the voice coil and its housing, is attached to the tubular or member. In this attachment, the coil support or housing is provided with an opening or hole therethrough, in a location removed from the coil, which is sized to provide a slip or sliding fit over the tubular member. The load beams and the voice coil housing are stacked on the tubular member in a predetermined sequence, the stack seating on the flange. A bracket for supporting the transducer wires, usually a flat flexible circuit, is preferably included in the stack as the last addition to the stack. The load beams are aligned with each other and with the voice coil housing and are thereafter secured to the tubular member.

According to the best mode for practicing this invention, the stack assembly of the load beams and the coil housing and the bracket is maintained in alignment and compressed against the flange of the tubular member. While compression of this actuator stack is maintained, a swaging tool, preferably a swage ball, is forced through the central opening of the tubular member from the end opposite the flange end. This expands or enlarges the outer diameter of the tubular member in the openings or holes in the several parts in the actuator stack, securing the assembly.

BRIEF DESCRIPTION OF THE DRAWINGS

The invention will be better understood by reference to the following specification when considered in conjunction with the accompanying drawings, in which.

DETAILED DESCRIPTION OF THE INVENTION

Figure 1:
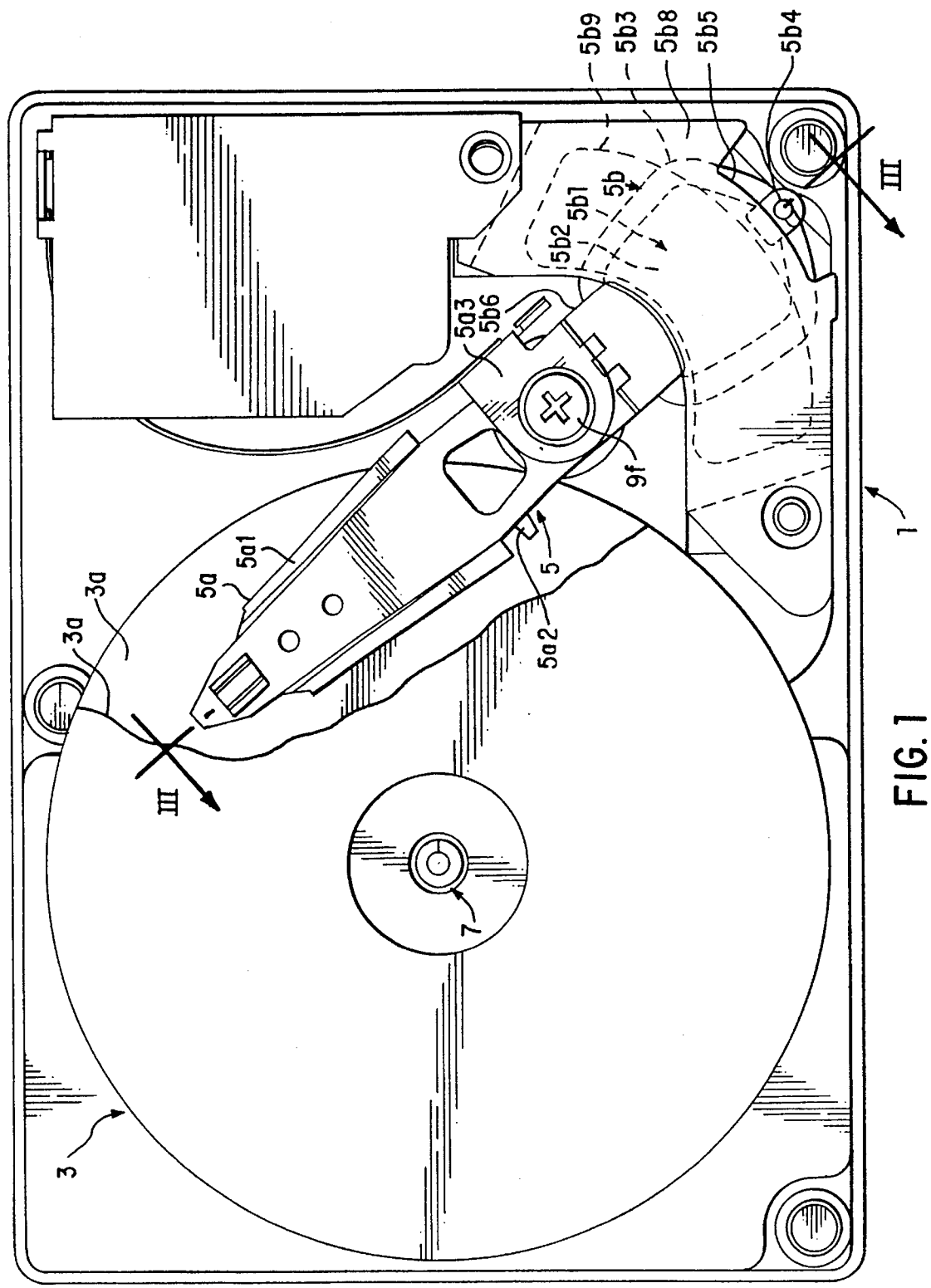
FIG. 1 is a plan view of a rotary actuator disk drive embodying the principles of this invention.
Figure 2:
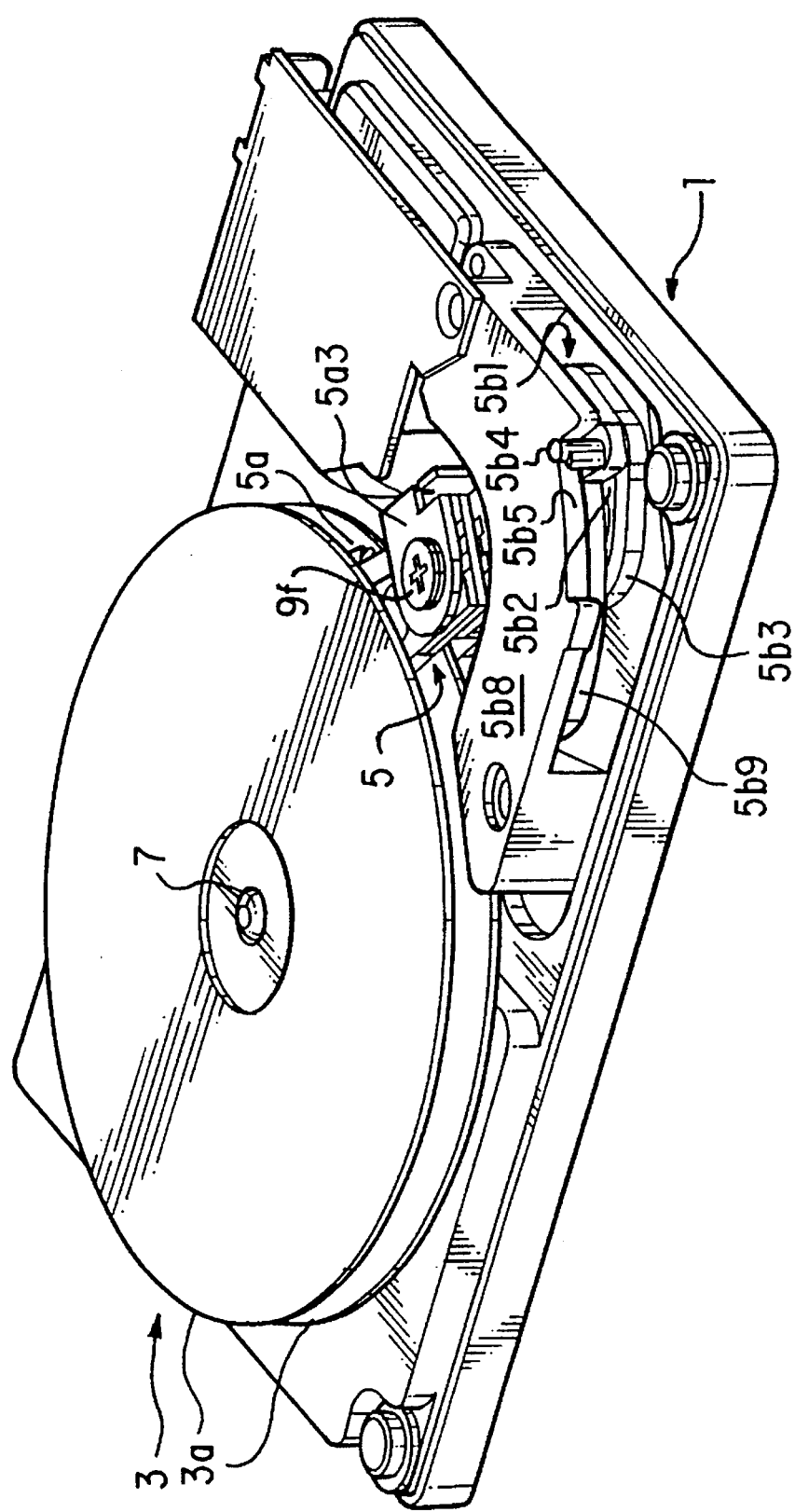
FIG. 2 is an isometric view of the disk drive of FIG. 1.

FIGS. 1 through 5 of the drawings illustrate a rotary actuator type of disk drive embodying the best mode for practicing this invention. The disk drive comprises a support or base 1 upon which a disk stack 3 and a rotary actuator assembly are rotatably mounted and sealed, within a housing, not shown. During operation, the disk stack 3 is rotated about the axis of a spindle 7 by an electric motor (not shown) at a predetermined constant speed, as is well known. The motor is secured to the base 1. The rotary actuator assembly 5 is assembled on a tubular member 9a, FIG. 3, which is a coaxial part of a two-piece spindle 9, the other part 9b of which is journaled in a pair of coaxial bearings 9c secured in the base 1. The rotary actuator assembly 5, comprises one or more load beams 5a, constituting an armstack, and a voice coil motor drive 5b therefor. A moving part 5b1 of the voice coil motor 5b has a coil support or housing 5b2 for a voice coil 5b3. An extension arm 5b6 of the coil support or housing 5b2 is stacked with the load beam or beams 5a, in a predetermined sequence, on the tubular member 9a and secured thereto. Angular movement of the rotary actuator assembly is limited by a crash stop structure comprising a pin 5b4 anchored in the coil support 5b2. The pin 5b4 projects adjacent an arcuate edge or recess 5b5 in an upper magnet plate 5b8 of the voice coil motor 5b, in which position the pin 5b4 engages the ends of the arcuate recess 5b5, to provide a mechanical limit to angular movement of the rotary actuator assembly 5. The upper magnet plate 5b8 supports a permanent magnet 5b9, forming part of the voice coil motor 5b.

Figure 3:
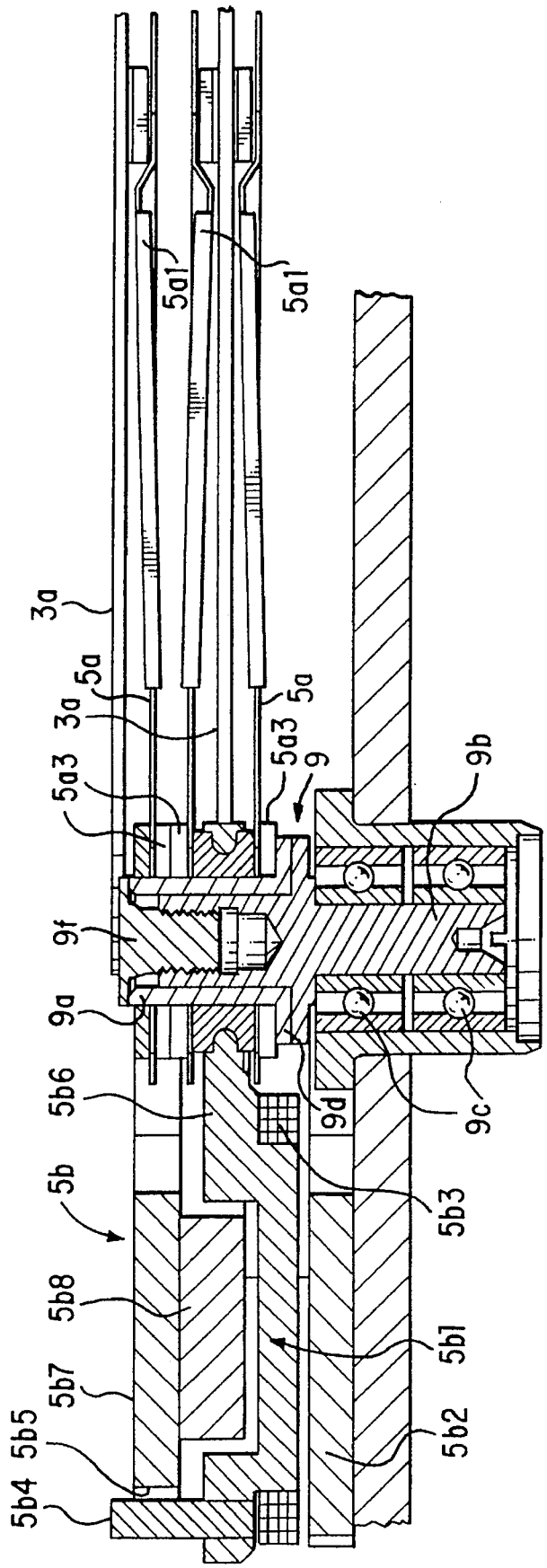
FIG. 3 is an enlarged sectional view of the rotary actuator assembly of FIG. 1 taken on the line III—III.

The structural details of the rotary actuator assembly 5 are best seen in the enlarged sectional view of FIG. 3. Here, for a specific disk drive, the disk stack 3 comprises two axially spaced disks, each designated 3a. The number of disks employed, within mechanical limits, is determined by the amount of data storage that is required for a particular application. The invention may be practiced using one or more disks.

The spindle assembly 9 of the rotary actuator assembly 5 comprises a tubular hub or cylindrical member 9a which is the upper section of the spindle 9. The tubular hub 9a is preferably a slip fit over an extension of a lower spindle section 9b and is thereby coaxially joined to the lower spindle section 9b. The lower spindle section 9b is journaled in a coaxial bearing pair 9c in the base 1. This coaxial spindle assembly 9 is secured by a screw 9f which threads into an axially threaded hole in the extension of the lower spindle section 9b.

The Tubular hub 9a has a peripheral flange 9d. The flange may be continuous or may comprise circumferentially spaced sectors. All of the parts of this rotary actuator assembly are assembled as a stack seated on the flange 9d of the tubular hub 9a. In particular, the parts in this stack comprise a plurality of load beams 5a (see also FIGS. 4 and 5) and the arm 5b6 of the coil support or housing 5b2, assembled on the tubular hub 9a in a particular sequence.

Figure 4:
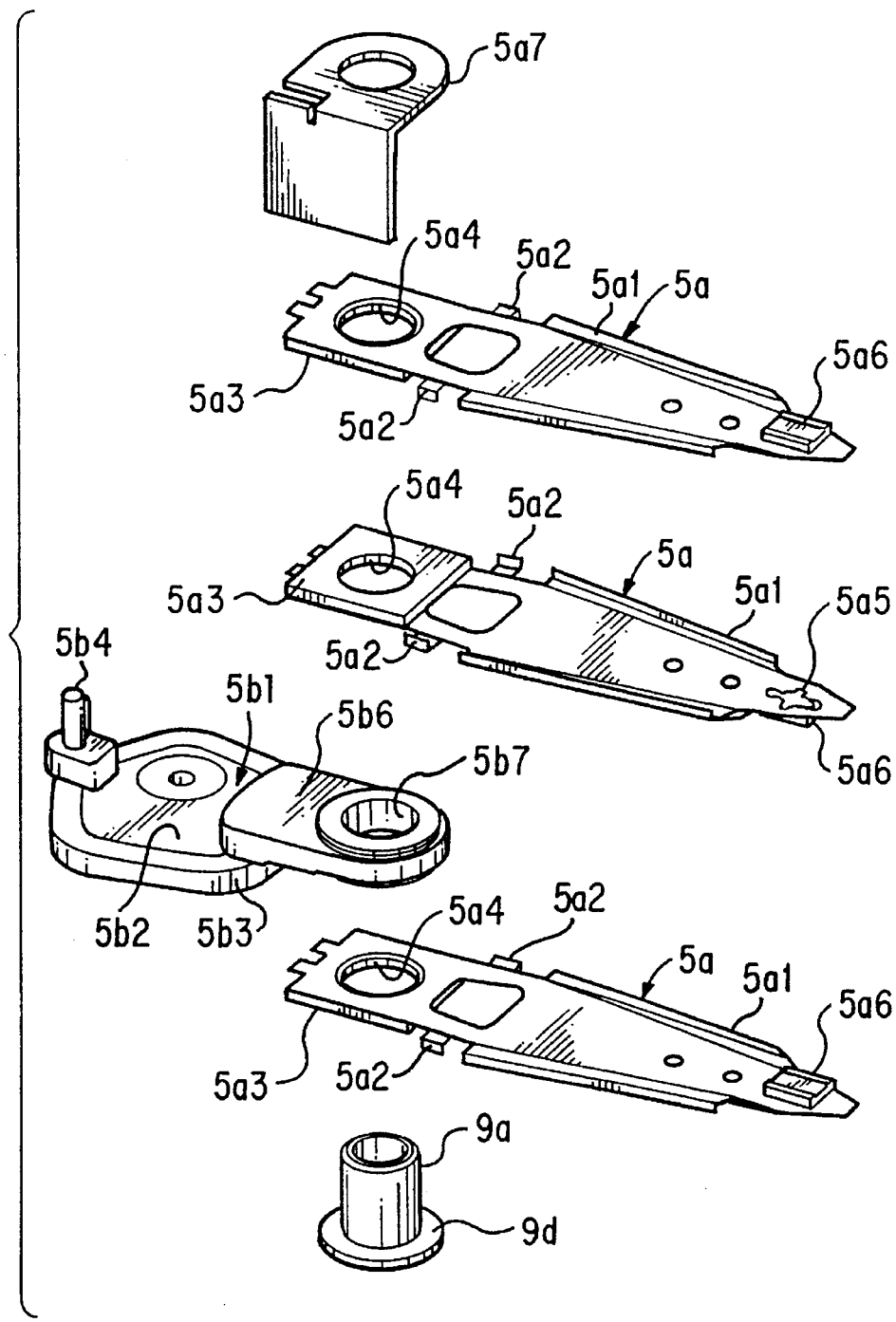
FIG. 4 is an exploded isometric view of a rotary actuator assembly according to this invention.
Figure 5:
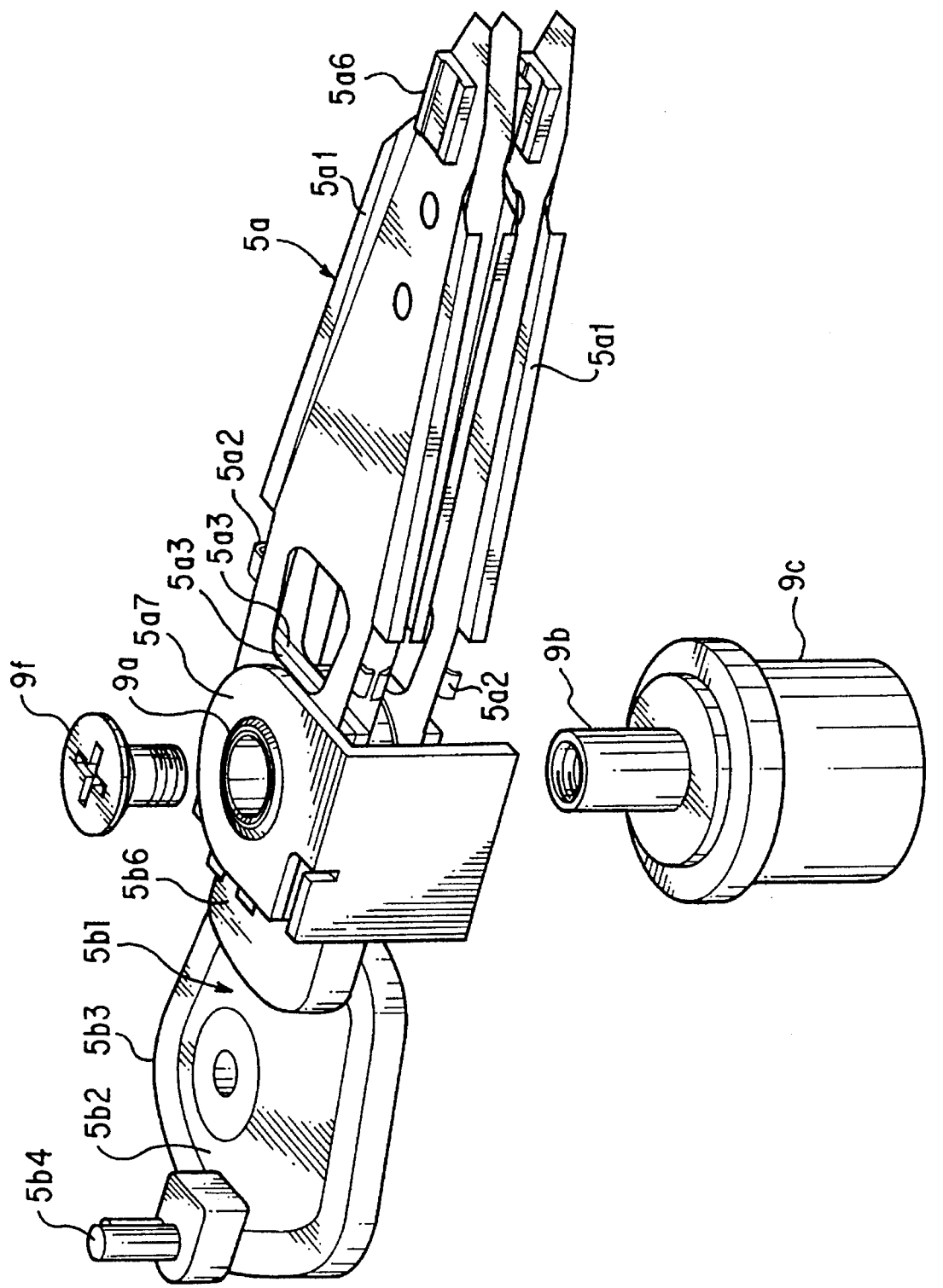
FIG. 5 is an isometric view of the three parts of the rotary actuator in exploded alignment for assembly.

The load beams 5a are configured as illustrated in FIGS. 4 and 5. In fabrication, they are etched from thin stainless steel sheet. In one practical embodiment of this invention, the stainless steel sheet was of the order of 3 mils thick. The flanges 5a1 are mechanically formed to provide the required load beam stiffness and stability. Tabs 5a2 are partially bent. Tab bending is completed at the time of installation of the transducer wires (not shown). The mounting end of each load beam comprises a reinforcing plate 5a3 which is welded to one side of the load beam, as viewed in FIG. 4. An opening or hole 5a4 is formed through the reinforcing plate 5a3 and the load beam 5a. The diameter of this hole or opening 5a4 is sufficient to provide a slip or sliding fit over the tubular hub 9a. The distal end of each load beam 5a has a leaf spring 5a5 attached thereto which functions as a gimbal mount for a transducer 5a6, such as a magnetic head, the slider of which is bonded thereto, as is well known. The transducer is mounted on the opposite side or face of the load beam 5a from that on which the reinforcing plate 5a3 is mounted.

The extension of the coil support or housing 5b2, represented in the arm 5b6, is also provided with an opening or hole 5b7 therethrough of a diameter to provide a slip or sliding fit over the cylindrical portion of the tubular hub 9a.

The thickness of the reinforcing plates 5a3 and of the arm 5b5 is related to the axial spacing of the disks. The minimum spacing of the disks is determined by the space required to clear the load beam/head assembly between the disks. Thus, for the assembly seen in FIG. 3, the reinforcing plates 5a3 when placed face to face, axially space the load beams 5a a distance apart which, together with any predetermined bend in the load beams, places the transducers 5a6 in the required spring loaded contact with the confronting surfaces of the axially spaced disks 3a. Similarly, the thickness of the arm 5b6 spaces the load beams 5a on each side thereof, as seen at the bottom of the stack in FIG. 3, to provide the required spring loading of the transducers against the opposite surfaces of the lowermost disk in the disk stack. The thickness of the arm 5b6 at the opening 5b7 is equal to the disk thickness plus twice the required height for spring loading of the load beams 5a.

If the transducer 5a6 is reversed in position on the load beam 5a from that seen in FIG. 5 and is placed on the same side of the load beam 5a as the reinforcing plate 5a3, then when the reinforcing plates 5a3 are placed in face-to-face contact, the transducers 5a6 confront one another and are properly spaced to make the required spring loaded contact with the opposite surfaces of a disk 3a. When the load beams 5a are placed on opposite sides of the arm 5b5 with the transducers 5a6 facing away from one another, the transducers 5a6 are spaced a distance apart to be properly spring loaded against the confronting surfaces of the axially spaced disks 3a.

For the transducer placement on the load beam seen in FIG. 4, the load beams 5a and the arm 5b6 of the coil support or housing 5b2 are loaded on the cylindrical member 9a in the sequence from bottom to top, as best seen in FIG. 3. A bracket 5a7 for supporting a flat flexible circuit or cable for the transducers 5a6, while not essential to this actuator assembly, is placed at the top of the stack. The bracket 5a7 has a useful purpose in the assembly operation in that the member which applies the compression force to the actuator stack bears against the bracket face. In the absence of the bracket, a bearing plate may be installed, if desired.

After this assembly, the load beams are aligned with one another and with the voice coil housing. A jig is useful for this purpose. The actuator stack thus formed is subject to axial pressure to compress the actuator stack against the flange 9d of the cylindrical member 9a. A swaging operation is then performed to expand the cylindrical member 9a into a secure compression engagement with the walls of the openings or holes in the load beams 3a and the arm 5b5, providing frictional restraint at and between the engaged faces in a degree to prevent any movement therebetween in the presence of environmental mechanical shock forces.

The swaging operation is advantageously performed using a swaging ball forced through the center hole of the tubular or cylindrical member 9a, starting at the end opposite the flange 9d, while the actuator stack is held in alignment and held in compression against the flange 9d. The assembly thus completed is coaxially joined to the lower spindle section 9b of the spindle 9.

While performance of the ball swaging operation is preferred as described above, the swaging operation may be reversed by forcing the swaging ball through the center hole of the tubular or cylindrical member 9a in the reverse direction.

For ball swaging, a cylindrical central opening in the tubular member is desirable. However, other cross sections are conceivable and feasible. Externally, the tubular member may comprise a longitudinal slot or key to automatically key or index load beams and the moving part of the actuator drive mechanism, having openings therein of corresponding cross section. Similarly, elliptical or angular cross sections, both internally and externally are contemplated within the scope of these teachings. Of course, the swaging tool is necessarily of the same cross section as the internal cross section of the tubular member, but slightly larger.

Although the transducer actuator assembly, according to this invention, is described as a rotary actuator which is the implementation of the best mode, this actuator is obviously applicable in a linear actuator type of disk drive by the simple expedient of attaching the tubular 9a to the linearly moving part of the linear drive motor or mechanism.

This transducer actuator structure eliminates unnecessary structure. The light weight load beam is scaled to the size of the disk and is particularly useful in small form factor drives, such as those of 3.5 form factor and less. This eliminates unnecessary structure, especially the case arms of the type of Coon et al. This reduces both the actuator mass and the parts count. Reduction of the actuator mass reduces the actuator drive power requirements and/or reduces the time to access a target track, the seek time. Reduction of the parts count reduces the inventory of parts, reducing the overhead cost burden. The elimination of parts from the drive eliminates that aspect of the cost and, with fewer parts, reduces the assembly cost, to reduce the total cost of the drive.

What is claimed is:

1. A disk drive, comprising:
 a. a disk drive base;
 b. at least one memory disk rotatably mounted to said base, said memory disk having a recording surface;
 c. at least one flexible integral load beam having a mounting end and a distal end, said mounting end having an opening therethrough;
 d. a reinforcing plate attached to said mounting end of said flexible integral load beam, said reinforcing plate having an opening therethrough aligned with said opening in said mounting end of said flexible integral load beam to form a reinforced mounting opening in the reinforced mounting end of said flexible integral load beam, said reinforced mounting opening being defined by a continuous wall;
 e. a transducer attached to said distal end of said flexible integral load beam;
 f. a tubular member having an external surface, said tubular member being disposed in said reinforced mounting opening of said flexible integral load beam, said external surface of said tubular member being compressed against said continuous wall of said opening in said reinforced mounting end of said flexible integral load beam, joining said tubular member and said flexible integral load beam together to form a transducer actuator assembly;
 g. means engaged with said transducer actuator assembly for movably mounting said transducer actuator assembly to said base with said flexible integral load beam and said transducer over said recording surface of said memory disk, and
 h. an actuator motor having a stator mounted to said base and a movable coil means for moving said transducer actuator assembly and moving said transducer to different radial locations with respect to said recording surface of said memory disk.

2. The disk drive according to claim 1, in which:
 a. said movable coil means comprises an arm having an opening therethrough defined by a continuous wall in said arm, said opening in said arm receiving said tubular member and being stacked on said tubular member with said mounting end of said flexible integral load beam, said external surface of said tubular member being compressed against wall of said opening in said arm.

3. The disk drive according to claim 2, comprising:
 a. at least two flexible integral load beams on said tubular member;
 b. said arm being disposed between said flexible integral load beams on said tubular member, and
 c. said flexible integral load beams project to opposite recording surfaces, respectively, of said memory disk.

4. A disk drive, comprising:
 a. a disk drive base;
 b. at least two axially spaced memory disks rotatably mounted to said base, each memory disk having opposite recording surfaces;
 c. at least three flexible integral load beams having a front face and a back face, a mounting end and a distal end, said mounting end of each flexible integral load beam having an opening therethrough;
 d. a reinforcing plate attached to the back face of the mounting end of each flexible integral load beam, each reinforcing plate having an opening therethrough aligned with the opening thereat in said mounting end of said flexible integral load beam to form a reinforced mounting opening in the reinforced mounting end of each flexible integral load beam, each reinforced mounting opening being defined by a continuous wall;
 e. a transducer attached to the front face of the distal end of said flexible integral load beam;
 f. an actuator motor having a stator on said base and having a moving part, said moving part having an arm, said arm having a mounting opening therethrough defined by a continuous wall in said arm;
 g. a tubular member having an axial opening therein, an external surface and a flange;
 h. said tubular member being disposed in each said reinforced mounting opening in the mounting end of each flexible integral load beam and in said opening in said arm with a first and a second of said flexible integral load beams being stacked on said tubular member with said front faces in confronting relationship and with said arm disposed therebetween, said reinforcing plate of said first flexible integral load beam engaging and seating upon said flange of said tubular member;
 i. a third of said at least three flexible integral load beams being disposed on said tubular member with its reinforcing plate engaging said reinforcing plate of said second flexible integral load beam;
 j. said external surface of said tubular member being compressed against said continuous wall of each said reinforced mounting opening in each reinforced mounting end of each flexible integral load beam and compressed against said continuous wall of said mounting opening in said arm, forming an integrated actuator assembly;
 k. an elongated member movably mounted to said base, and l. means for securing said elongated member within said axial opening in said tubular member of said integrated actuator assembly, said moving part of said actuator motor being located at said stator of said actuator motor, said transducers on said first and second flexible integral load beams being disposed, respectively, with respect to opposite recording surfaces of one of said at least two memory disks and said transducer of said third flexible integral load beam projecting to a recording surface of a second of said at least two memory disks.

5. A transducer actuator assembly having a pivot axis, comprising:

a. a separate tubular member having an external surface and an axial cylindrical opening therethrough through which a swaging tool may be passed, the tubular member being coaxial with the pivot axis of the transducer actuator;

b. a flexible integral load beam having a reinforced mounting end and a distal end, said reinforced mounting end having a reinforcing plate mounted thereto, said reinforced mounting end and the mounted reinforcing plate having a combined thickness greater than the thickness of said load beam, coaxial openings being formed through said reinforcing plate and through the reinforced mounting end of said flexible integral load beam, said openings being defined by a continuous wall, said separate tubular member being disposed in said openings with said external surface of said tubular member compressed against said continuous wall of said openings in said reinforced mounting end and said reinforcing plate to prevent relative rotation between said separate tubular member and said flexible integral load beam;

c. a transducer attached to said distal end of said flexible integral load beam, and d. a motor coil support member attached to said tubular member.

6. A transducer actuator assembly, comprising:

a. a separate tubular member having an external surface and an axial cylindrical opening therethrough through which a swaging tool may be passed;

b. a flexible integral load beam having a reinforced mounting end and a distal end, said reinforced mounting end having a reinforcing plate mounted thereto, said reinforced mounting end and the mounted reinforcing plate having a combined thickness greater than the thickness of said load beam, coaxial openings being formed through said reinforcing plate and through the reinforced mounting end of said flexible integral load beam, said openings being defined by a continuous wall, said separate tubular member being disposed in said openings with said external surface of said tubular member compressed against said continuous wall of said openings in said reinforced mounting end and said reinforcing plate;

c. a transducer attached to said distal end of said flexible integral load beam, and d. a motor coil support member attached to said tubular member, said motor coil support member comprising an arm having an opening therethrough coaxial with said openings through said reinforcing plate and said flexible integral load beam, said opening in said arm being defined by a continuous wall and receiving said separate tubular member therethrough, said external surface of said tubular member being compressed against said continuous wall of said opening in said arm.

7. A transducer actuator assembly, comprising:

a. a separate tubular hub having an external surface and having a flange and having an axial cylindrical opening therethrough through which a ball swaging tool may be passed;

b. a motor coil support member having an arm, said arm having an opening therethrough, said opening in said motor coil support arm being defined by a continuous wall;

c. at least one flexible integral load beam having a reinforced mounting end reinforced by a reinforcing plate mounted thereto, said reinforced mounting end and the mounted reinforcing plate having a combined thickness greater than the thickness of said flexible integral load beam, said flexible integral load beam having a distal end, coaxial openings being formed through said reinforcing plate and through the reinforced mounting end of said flexible integral load beam, said openings in said reinforcing plate and said reinforced mounting end being coaxial with said opening in said arm and being defined by a continuous wall;

d. a transducer attached to the distal end of said flexible load beam;

e. said arm of said motor coil support member and said flexible integral load beam receiving said separate tubular hub through said openings in each and being positioned in a stack seated upon said flange, said external surface of said tubular hub being compressed against said continuous walls in said openings to prevent relative rotation between said separate tubular member and said flexible integral load beam, wherein said coil support member and said flexible integral load beam project in substantially opposite directions from said tubular hub.

8. A disk drive, comprising:

a. a disk drive base;

b. at least one memory disk rotatably mounted to said base, said memory disk having opposite surfaces;

c. at least one flexible integral load beam having a reinforced mounting end and a distal end, said reinforced mounting end being reinforced by a reinforcing plate mounted thereto, said reinforced mounting end and the mounted reinforcing plate having a combined thickness greater than the thickness of said load beam, coaxial openings being formed through said reinforcing plate and through the reinforced mounting end of said flexible integral load beam, said openings being defined by a continuous wall;

d. a transducer mounted on said distal end of said flexible integral load beam;

e. a motor having a stator mounted to said base and having a coil;

f. a coil support mounting said coil;

g. an arm projecting from said coil support, said arm having an opening therethrough in a position displaced from said coil, said opening in said arm being defined by a continuous wall;

h. a separate tubular member having an external surface and having an axial opening therein through which a swaging tool may be passed;

i. an external flange on said tubular member;

j. said tubular member being disposed in said openings at said reinforced mounting end of said flexible integral load beam and in said opening in said arm, with said flexible integral load beam and said arm in a stack on said tubular member seated against said external flange and with said flexible integral load beam and said arm projecting in opposite directions from said tubular member, said external surface of said tubular member being compressed against said continuous wall of each said opening in said reinforced mounting end of said flexible integral load beam and said arm, forming a separate integrated actuator assembly;

k. an elongated member rotatably journaled to said base for rotation about an axis, and l. means for securing said elongated member coaxially within said axial opening of said tubular member of said separate integrated actuator assembly, said coil being located at said stator of said motor and said transducer being located over one surface of said opposite surfaces of said memory disk member.

9. A disk drive, comprising:

a. a disk drive base;

b. at least one memory disk rotatably mounted to said base, said memory disk having opposite surfaces;

c. at least two flexible load beams, each having a reinforced mounting end reinforced by a reinforcing plate and a distal end, said reinforced mounting end and the mounted reinforcing plate having a thickness greater than the thickness of said load beam, coaxial openings being formed through each reinforced mounting end and mounted reinforcing plate, each opening having a continuous wall;

d. a transducer mounted on the distal end of each flexible load beam;

e. a motor having a stator on said base and having a coil;

f. a coil support mounting said coil;

g. an arm projecting from said coil support, said arm having an opening therethrough in a position displaced from said coil, said opening in said arm having a continuous wall;

h. a separate tubular member having an external surface, an external flange and an axial opening therein through which a swaging tool may be passed;

i. said tubular member being disposed in said openings in each of said at least two flexible load beams and said opening in said arm, mounting said at least two flexible load beams and said arm in a stack on said tubular member seated against said external flange, said arm being disposed between said reinforced mounting ends of said flexible load beams in said stack, said flexible load beams projecting in the same direction from said tubular member and said arm projecting from said tubular member in a direction substantially opposite to said flexible load beams, said external surface of said tubular member being compressed against said walls of said openings in each of said flexible load beams and compressed against said wall of said opening in said arm, forming a separate integrated actuator assembly;

j. an elongated member movable mounted to said base, and k. means for securing said elongated member within said axial opening of said tubular member of said separate integrated actuator assembly, said coil being located at said stator of said motor and said transducers being disposed, respectively, with respect to opposite surfaces of said memory disk.

10. A disk drive, comprising;

a. a disk drive base;

b. at least two axially spaced memory disks rotatably mounted on said base, each memory disk having opposite surfaces;

c. at least three flexible load beams each load beam having a front face, a back face, a mounting end and a distal end, each mounting end having an opening therethrough;

d. a transducer mounted on the front face at said distal end of each flexible load beam;

e. a reinforcing plate attached to the back face of the mounting end of each flexible load beam, each reinforcing plate having an opening therethrough aligned with the opening thereat in said mounting end of each flexible load beam;

f. a motor having a stator on said base and a coil;

g. a coil support mounting said coil;

h. an arm projecting from said coil support, said arm having an opening therethrough in a position displaced from said coil;

i. a tubular member having an axial opening therein, defining an axis;

j. an external flange on said tubular member;

k. said tubular member being disposed in each said opening at said mounting end of each said flexible load beam and said opening in said arm with a first and a second of said at least three flexible load beams being stacked on said tubular member with said front faces in confronting relationship and with said arm disposed therebetween, said reinforcing plate of said first flexible load beam engaging and seating upon said flange of said tubular member, a third of said at least three flexible load beams being disposed on said tubular member with its reinforcing plate engaging the reinforcing plate of said second flexible load beam, said at least three flexible load beams and said arm projecting in opposite directions from said tubular member, said tubular member being in engagement with each flexible load beam and said arm in each said opening, forming a separate integrated actuator assembly;

l. an actuator support member rotatably journaled to said base for rotation about an axis, and m. means for securing said actuator support member within said axial opening of said tubular member of said separate integrated actuator assembly, said coil being located at said stator of said motor and said transducers on said first and second flexible load beams being disposed, respectively, with respect to opposite surfaces of one of said at least two memory disks, and with the transducer of said third flexible load beam projecting to a surface of said opposite surfaces of a second of said at least two memory disks, said axis of said actuator support member coinciding with the axis of said axial opening in said tubular member.

* * * * *